(12) United States Patent
Liu et al.

(10) Patent No.: US 11,762,697 B2
(45) Date of Patent: Sep. 19, 2023

(54) METHOD AND APPARATUS FOR SCHEDULING RESOURCE FOR DEEP LEARNING FRAMEWORK

(71) Applicant: BEIJING BAIDU NETCOM SCIENCE AND TECHNOLOGY CO., LTD., Beijing (CN)

(72) Inventors: Kun Liu, Beijing (CN); Kai Zhou, Beijing (CN); Qian Wang, Beijing (CN); Yuanhao Xiao, Beijing (CN); Lan Liu, Beijing (CN); Dongze Xu, Beijing (CN); Tianhan Xu, Beijing (CN); Jiangliang Guo, Beijing (CN); Jin Tang, Beijing (CN); Faen Zhang, Beijing (CN); Shiming Yin, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1035 days.

(21) Appl. No.: 16/248,560

(22) Filed: Jan. 15, 2019

(65) Prior Publication Data
US 2019/0228303 A1     Jul. 25, 2019

(30) Foreign Application Priority Data
Jan. 25, 2018 (CN) .......................... 201810073413.0

(51) Int. Cl.
*G06N 3/08* (2023.01)
*G06F 9/50* (2006.01)
(Continued)

(52) U.S. Cl.
CPC .......... *G06F 9/5027* (2013.01); *G06F 9/5011* (2013.01); *G06F 18/24143* (2023.01);
(Continued)

(58) Field of Classification Search
CPC ....... G06N 3/08; G06F 9/5011; G06K 9/6217
See application file for complete search history.

(56) References Cited

U.S. PATENT DOCUMENTS

| | | | | |
|---|---|---|---|---|
| 5,867,704 A | * | 2/1999 | Tanaka ..................... | G06F 9/505 718/105 |
| 6,169,981 B1 | * | 1/2001 | Werbos .............. | G05B 13/0285 706/26 |

(Continued)

FOREIGN PATENT DOCUMENTS

| | | | |
|---|---|---|---|
| CN | 103533086 A | * | 1/2014 |
| CN | 107203424 A | | 9/2017 |
| CN | 107622427 A | | 1/2018 |

OTHER PUBLICATIONS

Seetharami Seelam and Yubo Li, "IBM Research: Speeding Up Deep Learning Services: When GPUs Meet Container Clouds", presented at GPU Tech Conference, San Jose, CA, USA, May 10, 2017, retrieved from online on Mar. 3, 2022. (Year: 2017).*

(Continued)

*Primary Examiner* — Shourjo Dasgupta
(74) *Attorney, Agent, or Firm* — Knobbe, Martens, Olson & Bear, LLP (57) ABSTRACT

The present disclosure discloses a method and apparatus for scheduling a resource for a deep learning framework. The method can comprise: querying statuses of all deep learning job objects from a Kubernetes platform at a predetermined interval; and submitting, in response to finding from the queried deep learning job objects a deep learning job object having a status conforming to a resource request submission status, a resource request to the Kubernetes platform to schedule a physical machine where the Kubernetes platform is located to initiate a deep learning training task. The (Continued)

method can completely automate the allocation and release on the resource of the deep learning training task.

5 Claims, 4 Drawing Sheets

(51) Int. Cl.
  *G06F 18/2413*  (2023.01)
  *G06V 10/764*  (2022.01)
  *G06V 10/82*  (2022.01)
  *G06F 18/21*  (2023.01)

(52) U.S. Cl.
  CPC ............ *G06N 3/08* (2013.01); *G06V 10/764* (2022.01); *G06V 10/82* (2022.01); *G06F 18/21* (2023.01)

(56) References Cited

U.S. PATENT DOCUMENTS

| | | | | |
|---|---|---|---|---|
| 8,713,096 | B2* | 4/2014 | Lin | G06F 8/60 709/224 |
| 8,745,629 | B2* | 6/2014 | Gargash | G06F 9/5011 718/104 |
| 9,172,738 | B1* | 10/2015 | daCosta | G06Q 30/0601 |
| 9,830,192 | B1* | 11/2017 | Crouchman | G06F 9/5011 |
| 9,983,909 | B1* | 5/2018 | Tyde, III | G06F 9/5072 |
| 10,048,987 | B1* | 8/2018 | Graham | G06F 9/5011 |
| 10,303,522 | B2* | 5/2019 | Zhou | G06F 9/5044 |
| 10,360,053 | B1* | 7/2019 | Christensen | G06F 9/48 |
| 10,599,471 | B1* | 3/2020 | Hilton | G06F 9/5022 |
| 10,719,369 | B1* | 7/2020 | Aithal | G06F 9/45558 |
| 10,891,156 | B1* | 1/2021 | Zhao | G06F 9/4881 |
| 10,891,525 | B1* | 1/2021 | Olgiati | G06V 30/2504 |
| 11,057,469 | B2* | 7/2021 | Lv | G06F 3/067 |
| 2003/0177228 | A1* | 9/2003 | Vigouroux | G06F 11/3006 709/224 |
| 2005/0228855 | A1* | 10/2005 | Kawato | H04L 41/0869 709/200 |
| 2010/0094999 | A1* | 4/2010 | Rama | G06F 9/4843 709/225 |
| 2011/0173628 | A1* | 7/2011 | Gargash | G06F 9/5011 718/104 |
| 2011/0231450 | A1* | 9/2011 | Sinha | G06F 16/256 707/802 |
| 2012/0331249 | A1* | 12/2012 | Benjamin | G06F 3/0607 711/E12.103 |
| 2013/0201900 | A1* | 8/2013 | Zhang | H04W 72/04 370/315 |
| 2016/0170811 | A1* | 6/2016 | Peacock | G06F 3/0482 718/106 |
| 2016/0188594 | A1* | 6/2016 | Ranganathan | G06F 9/5066 707/769 |
| 2016/0291942 | A1* | 10/2016 | Hutchison | G06F 8/41 |
| 2017/0220949 | A1* | 8/2017 | Feng | G06N 20/00 |
| 2017/0366425 | A1* | 12/2017 | Latapie | H04L 43/04 |
| 2018/0068031 | A1* | 3/2018 | Hewavitharana | G06N 3/006 |
| 2018/0143858 | A1* | 5/2018 | Sanjabi | G06F 9/5061 |
| 2018/0260687 | A1* | 9/2018 | Kanno | G06N 3/0454 |
| 2018/0285166 | A1* | 10/2018 | Roy | G06F 9/5016 |
| 2018/0332138 | A1* | 11/2018 | Liu | H04L 41/5041 |
| 2019/0102667 | A1* | 4/2019 | Bashkirov | G06N 5/022 |
| 2019/0163536 | A1* | 5/2019 | Parees | G06F 9/4881 |
| 2019/0205164 | A1* | 7/2019 | Kumar | G06F 9/4881 |
| 2019/0324766 | A1* | 10/2019 | Parthasarathy | G06F 11/301 |

OTHER PUBLICATIONS

Rita Zhang, "Autoscaling Deep Learning Training with Kubernetes", published on Nov. 21, 2017 at https://devblogs.microsoft.com/cse/2017/11/21/autoscaling-deep-learning-training-kubernetes, retrieved on Mar. 3, 2022. (Year: 2017).*

Justin Ellingwood, "The Docker Ecosystem: Scheduling and Orchestration", published on Feb. 1, 2015 at https://www.digitalocean.com/community/tutorials/the-docker-ecosystem-scheduling-and-orchestration, retrieved on Mar. 3, 2022. (Year: 2015).*

Christopher Berner, "Scaling Kubernetes to 2,500 Nodes", published on Jan. 18, 2018 at https://openai.com/blog/scaling-kubernetes-to-2500-nodes, retrieved on Mar. 3, 2022. (Year: 2018).*

Xu Yan et al, "PaddlePaddle Fluid: Elastic Deep Learning on Kubernetes", published on Dec. 6, 2017 to https://kubernetes.io/blog/2017/12/paddle-paddle-fluid-elastic-learning, retrieved Mar. 3, 2022. (Year: 2017).*

Yi Wang and Xiang Li, "Run Deep Learning With PaddlePaddle On Kubernetes", published on Feb. 8, 2017 to https://kubernetes.io/blog/2017/02/run-deep-learning-with-paddlepaddle-on-kubernetes, retrieved Mar. 3, 2022. (Year: 2017).*

"Borg: The Predecessor to Kubernetes", published on Apr. 23, 2015 to https://kubernetes.io/blog/2015/04/borg-predecessor-to-kubernetes, retrieved on Jun. 24, 2022. (Year: 2015).*

Docker Documentation, "How Services Work", published on Jul. 27, 2016 to https://docs.docker.com/engine/swarm/how-swarm-mode-works/services, retrieved on Jun. 24, 2022. (Year: 2016).*

Docker Documentation, "Swarm task states", published on Oct. 13, 2017 to https://docs.docker.com/engine/swarm/how-swarm-mode-works/swarm-task-states/, retrieved on Jun. 24, 2022. (Year: 2017).*

Nigel Brown, "Scheduling Services on a Docker Swarm Mode Cluster", published on May 24, 2017 to https://semaphoreci.com/community/tutorials/scheduling-services-on-a-docker-swarm-mode-cluster, retrieved on Jun. 24, 2022. (Year: 2017).*

Mu Li, "Scaling Distributed Machine Learning with System and Algorithm Co-Design", published Feb. 2017 to https://www.cs.cmu.edu, retrieved Nov. 16, 2022 (Year: 2017).*

Daniel Sanche, "Kubernetes 101: Pods, Nodes, Containers, and Clusters", published Jan. 2, 2018 to https://medium.com/google-cloud/kubernetes-101-pods-nodes-containers-and-clusters-c1509e409e16, retrieved Nov. 16, 2022 (Year: 2018).*

Kubernetes Blog, "How Container Metadata Changes Your Point of View", published Mar. 28, 2016 to https://kubernetes.io/blog/2016/03/how-container-metadata-changes-your-point-of-view, retrieved Nov. 16, 2022 (Year: 2016).*

Tutorialspoint, "Kubernetes—Jobs", published May 29, 2017 to https://www.tutorialspoint.com/kubernetes/kubernetes_jobs.html, retrieved Nov. 16, 2022 (Year: 2017).*

Red Hat OpenShift, "Jobs—Developer Guide", published Jul. 9, 2017 to https://docs.openshift.com/container-platform/3.11/dev_guide/jobs.html, retrieved Nov. 16, 2022 (Year: 2017).*

Julia Evans, "Learning to Operate Kubernetes Reliably", published Dec. 20, 2017 to https://stripe.com/blog/operating-kubernetes, retrieved Nov. 16, 2022 (Year: 2017).*

Google Kubernetes Engine, "Overview of Deploying Workloads", published Nov. 11, 2017 to https://cloud.google.com/kubernetes-engine/docs/how-to/deploying-workloads-overview, retrieved Nov. 16, 2022 (Year: 2017).*

Google Kubernetes Engine, "Running a Job", published on Nov. 13, 2017 at https://cloud.google.com/kubernetes-engine/docs/how-to/jobs, retrieved Jan. 27, 2023. (Year: 2017).*

Dec. 11, 2018 Kubernetes Gpus Tensorflow; http://web_.archive.org/web/20171_O_22103353/https: //medium._com/i_ntu_itio_n_mach_ine/ku_bern_etes-gpus-tenso_rflow-8696232862_ca_1 (16 pages).

Dec. 21, 2018, First Chinese Office Action in CN application No. 201810073413.0 (24 pages).

* cited by examiner

METHOD AND APPARATUS FOR SCHEDULING RESOURCE FOR DEEP LEARNING FRAMEWORK

CROSS-REFERENCE TO RELATED APPLICATIONS

This application claims priority to Chinese Patent Application No. 201810073413.0, filed on Jan. 25, 2018, titled "Method and Apparatus for Scheduling Resource for Deep Learning Framework," the entire disclosure of which is hereby incorporated by reference in its entirety.

TECHNICAL FIELD

The present disclosure relates to the field of computer technology, specifically to the field of computer network technology, and more specifically to a method and apparatus for scheduling a resource for a deep learning framework.

BACKGROUND

In the field of deep learning, the task of training an algorithm model is generally implemented based on a deep learning framework. The currently popular deep learning frameworks include the tensorflow artificial intelligence learning system (Tensorflow), the parallel distributed deep learning open-source platform (PaddlePaddle), the convolutional architecture for fast feature embedding (Caffe), etc.

Numerous deep learning frameworks have their respective characteristics. Accordingly, when a developer faces a specific scenario, the framework selected to realize the model is different. However, regardless of the framework on which the training on the model is based, the process of running the training task needs resource management and task scheduling. That is, the computational resources of a server cluster such as a CPU, a memory, and a GPU are uniformly managed, and a resource container is allocated according to an requirement for the resource of the training task. In addition, with the running and termination of the training task, the allocation and reclaim on the occupied computational resources are performed in real time.

At present, the support for multiple deep learning frameworks may be realized using a Kubernetes platform. At the Kubernetes platform, when running a model training task, the developer needs to be involved in the resource management of the Kubernetes platform, to request an expected computational resource container from the platform and then request a different network policy, to coordinate with the running of the training task.

SUMMARY

Embodiments of the present disclosure provide a method and apparatus for scheduling a resource for a deep learning framework.

In a first aspect, the embodiments of the present disclosure provide a method for scheduling a resource for a deep learning framework. The method includes: querying statuses of all deep learning job objects from a Kubernetes platform at a predetermined interval; and submitting, in response to finding from the queried deep learning job objects a deep learning job object having a status conforming to a resource request submission status, a resource request to the Kubernetes platform to schedule a physical machine where the Kubernetes platform is located to initiate a deep learning training task.

In some embodiments, the deep learning job object includes: a nodegroup parent attribute; an image sub-attribute set under the nodegroup parent attribute; and a resource configuration sub-attribute set under the nodegroup parent attribute.

In some embodiments, the submitting, in response to finding from the queried deep learning job objects a deep learning job object having a status conforming to a resource request submission status, a resource request to the Kubernetes platform includes: extracting, in response to querying, from the each of the deep learning job objects, a deep learning job object having a status conforming to a new creation status, a resource configuration sub-attribute of the deep learning job object having the status conforming to the new creation status; and sending, based on the extracted resource configuration sub-attribute, the resource request to an application programming interface server service of the Kubernetes platform, to request a container resource and a network policy.

In some embodiments, the submitting, in response to finding from the queried deep learning job objects a deep learning job object having a status conforming to a resource request submission status, a resource request to the Kubernetes platform includes: reclaiming, in response to finding from the queried deep learning job objects, a deep learning job object having a status conforming to a termination status, a resource of the deep learning job object having the status conforming to the termination status.

In some embodiments, the scheduling the physical machine where the Kubernetes platform is located to initiate the deep learning training task includes: receiving the resource request via the application programming interface server service of the Kubernetes platform, to create a resource object; asynchronously monitoring the created resource object via a scheduler service of the Kubernetes platform, to allocate the created resource object to a sub-node; and running a container corresponding to the resource object via the sub-node, to complete the deep learning training task.

In a second aspect, the embodiments of the present disclosure provide an apparatus for scheduling a resource for a deep learning framework includes: a querying unit, configured to query statuses of all deep learning job objects from a Kubernetes platform at a predetermined interval; and a scheduling unit, configured to submit, in response to finding from the queried deep learning job objects a deep learning job object having a status conforming to a resource request submission status, a resource request to the Kubernetes platform to schedule a physical machine where the Kubernetes platform is located to initiate a deep learning training task.

In some embodiments, the deep learning job objects in the querying unit include: a nodegroup parent attribute; an image sub-attribute set under the nodegroup parent attribute; and a resource configuration sub-attribute set under the nodegroup parent attribute.

In some embodiments, the scheduling unit includes: an extracting subunit, configured to extract, in response to finding from the queried deep learning job objects, a deep learning job object having a status conforming to a new creation status, a resource configuration sub-attribute of the deep learning job object having the status conforming to the new creation status; and a sending subunit, configured to send, based on the extracted resource configuration sub-attribute, the resource request to an application programming interface server service of the Kubernetes platform, to request a container resource and a network policy.

In some embodiments, the scheduling unit includes: a reclaiming subunit, configured to reclaim, in response to finding from the queried deep learning job objects a deep learning job object having a status conforming to a termination status, a resource of the deep learning job object having the status conforming to the termination status.

In some embodiments, in the scheduling unit, scheduling the physical machine where the Kubernetes platform is located to initiate the deep learning training task includes: receiving the resource request via the application programming interface server service of the Kubernetes platform, to create a resource object; asynchronously monitoring the created resource object via a scheduler service of the Kubernetes platform, to allocate the created resource object to a sub-node; and running a container corresponding to the resource object via the sub-node, to complete the deep learning training task.

In a third aspect, the embodiments of the present disclosure provide a device. The device includes: one or more processors; and a storage device, configured to store one or more programs. The one or more programs, when executed by the one or more processors, cause the one or more processors to implement the method for scheduling a resource for a deep learning framework in any of the embodiments described above.

In a fourth aspect, the embodiments of the present disclosure provide a computer readable storage medium storing a computer program. The program, when executed by a processor, implements the method for scheduling a resource for a deep learning framework in any of the embodiments described above.

According to the method and apparatus for scheduling a resource for a deep learning framework provided by the embodiments of the present disclosure, the statuses of all the deep learning job objects are queried from the Kubernetes platform at the predetermined interval. Then, in response to finding from the queried deep learning job objects the deep learning job object having the status conforming to the resource request submission status, the resource request is submitted to the Kubernetes platform to schedule the physical machine where the Kubernetes platform is located to initiate the deep learning training task. In the process, a plurality of deep learning framework training tasks may be supported over a uniform resource pool, and the allocation and release on the resources of the deep learning training tasks can be completely automated, which facilitate a developer focusing on the program logic of the training tasks, without manually managing the resource. Thus, the efficiency of the model training is improved, and an access threshold may be reduced for the support for a new deep learning framework. Since only the configuration of the deep learning job object needs to be adjusted by the developer, without adding a new developing task, a high flexibility is possessed.

BRIEF DESCRIPTION OF THE DRAWINGS

After reading detailed descriptions of non-limiting embodiments given with reference to the following accompanying drawings, other features, objectives, and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
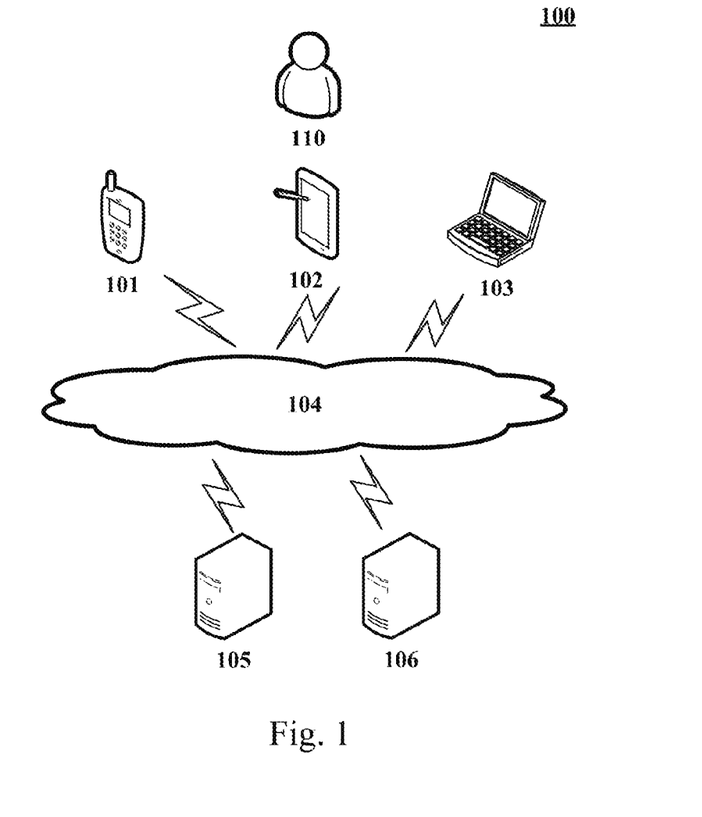
FIG. 1 illustrates a system architecture in which embodiments of a method for scheduling a resource for a deep learning framework and an apparatus for scheduling a resource for a deep learning framework according to the present disclosure may be applied.

FIG. 1 shows a system architecture 100 in which a method for scheduling a resource for a deep learning framework or an apparatus for scheduling a resource for a deep learning framework according to the embodiments of the present disclosure.

As shown in FIG. 1, the system architecture 100 may include terminal devices 101, 102 and 103, a network 104 and servers 105 and 106. The network 104 serves as a medium providing a communication link between the terminal devices 101, 102 and 103 and the servers 105 and 106. The network 104 may include various types of connections, such as wired or wireless transmission links, or optical fibers.

The user 110 may use the terminal devices 101, 102 and 103 to interact with the servers 105 and 106 through the network 104, in order to transmit or receive messages, etc. Various communication client applications, such as cloud storage applications, shopping applications, search applications, instant messaging tools, mailbox clients, and social platform software may be installed on the terminal devices 101, 102 and 103.

The terminal devices 101, 102 and 103 may be various electronic devices having display screens, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The servers 105 and 106 may be servers providing various services, for example, backend servers providing a support to the terminal devices 101, 102 or 103. The backend server may perform a corresponding processing such as storage or calculation on data of the terminals, and push the storage or calculation results to the terminal devices.

Generally, the method for scheduling a resource for a deep learning framework according to the embodiments of the present disclosure is generally executed by the servers 105 and 106. Accordingly, the apparatus for scheduling a resource for a deep learning framework is generally installed on the servers 105 and 106.

It should be appreciated that the numbers of the terminal devices, the networks and the servers in FIG. 1 are merely illustrative. Any number of terminal devices, networks and servers may be provided based on the actual requirements.

Figure 2:
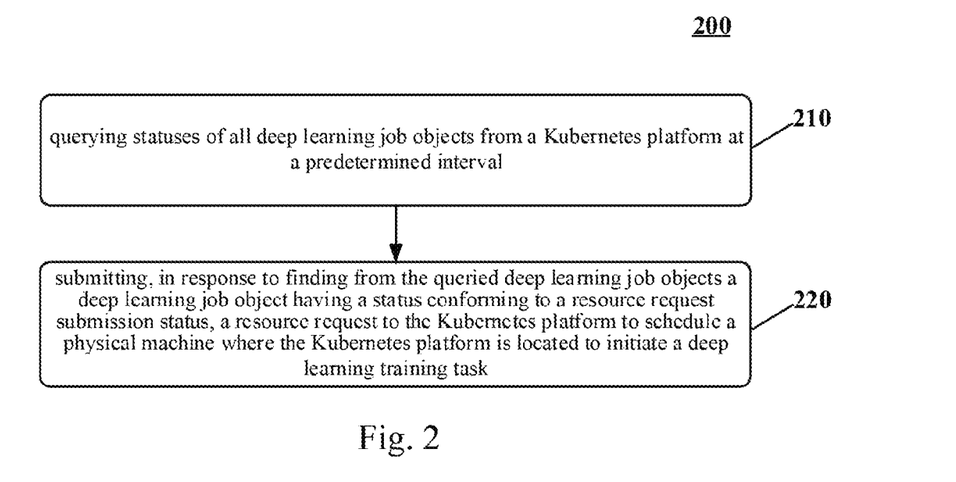
FIG. 2 is a schematic flowchart of an embodiment of the method for scheduling a resource for a deep learning framework according to the embodiments of the present disclosure.

Further referring to FIG. 2, which is a schematic flowchart of an embodiment of a method for scheduling a resource for a deep learning framework according to the embodiments of the present disclosure.

As shown in FIG. 2, the method 200 for scheduling a resource for a deep learning framework includes steps 210 and 211.

Step 210 includes querying statuses of all deep learning job objects from a Kubernetes platform at a predetermined interval.

In this embodiment, an electronic device (e.g., the server shown in FIG. 1) performing the method for scheduling a resource for a deep learning framework may send an HTTPS request to the application programming interface server (Api-server) service of the Kubernetes platform at the predetermined interval, to query the statuses of all deep learning job objects from the Kubernetes platform. Here, the predetermined interval may be predefined. By using a container cluster management system (the Kubernetes platform) as underlying container resource scheduling management, the scheduling management on different deep learning framework tasks may be realized.

The deep learning job object includes: a nodegroup parent attribute; an image sub-attribute set under the nodegroup parent attribute; and a resource configuration sub-attribute set under the nodegroup parent attribute.

Here, a type of a deep learning job resource may be defined to uniformly represent a deep learning model training task, and the type includes the nodegroup parent attribute, and the image sub-attribute and the resource configuration sub-attribute provided under the NodeGroup attribute. The differences of different deep learning tasks are represented by the number of NodeGroups, the specific image attribute value, and the resource configuration sub-attribute. For a specific training task, a developer submits and sends the constructed deep learning job object to the Kubernetes platform, and thus the operation of requesting the resource may be completed.

Step 220 includes submitting, in response to finding, from the queried deep learning job objects, a deep learning job object having a status conforming to a status of submitting a resource request, a resource request to the Kubernetes platform to schedule a physical machine where the Kubernetes platform is located to initiate a deep learning training task.

In this embodiment, the electronic device performing the method for scheduling a resource for a deep learning framework may first query the statuses of deep learning job objects, and then determine whether to submit the resource request to the Kubernetes platform according to the query result. If the submission of the resource request to the Kubernetes platform is determined, the resource request may be submitted to the Api-server service of the Kubernetes platform, to request the resource required for the deep learning training task, and the physical machine where the Kubernetes platform is located is scheduled to initiate the deep learning training task.

In a specific example, in the method for scheduling a resource for a deep learning framework, a pre-designed deep learning controller may interact with the Kubernetes platform. The deep learning controller here is a program independent of the Kubernetes platform. The deep learning controller is responsible for periodically querying the statuses of all the deep learning job objects from Kubernetes, and determining, according to the statuses of deep learning job objects, whether to submit the resource request to request a container resource and a network policy from Kubernetes for running the training task expressed by the deep learning job object.

In the method for scheduling a resource for a deep learning framework provided by the above embodiment of the present disclosure, a plurality of deep learning framework training tasks may be supported over a uniform resource pool, and the allocation and release on the resources of the deep learning training tasks can be completely automated, which facilitate the developer focusing on the program logic of the training tasks, without manually managing the resource. Thus, the efficiency of the model training is improved, and an access threshold may be reduced for the support for a new deep learning framework. Since only the configuration of the deep learning job object needs to be adjusted, without adding a new developing task, a high flexibility is possessed.

Figure 3:
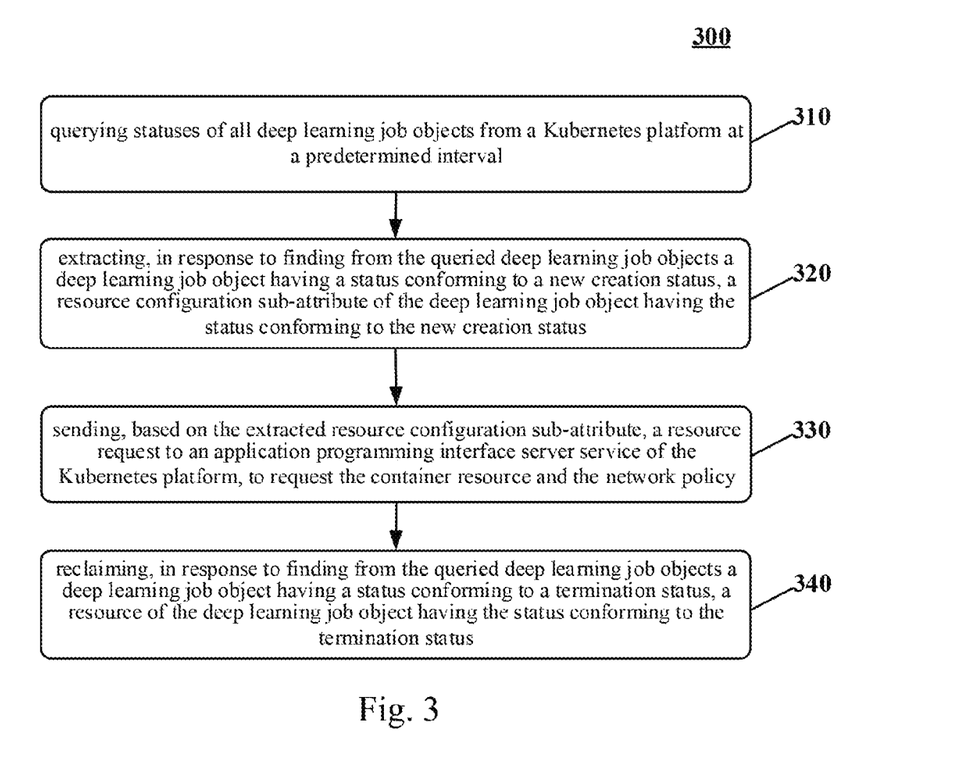
FIG. 3 is a schematic flowchart of another embodiment of the method for scheduling a resource for a deep learning framework according to the embodiments of the present disclosure.

Further reference is made to FIG. 3, which is a schematic flowchart of another embodiment of the method for scheduling a resource for a deep learning framework according to the embodiments of the present disclosure.

As shown in FIG. 3, the method 300 for scheduling a resource for a deep learning framework includes the steps 310 to 340.

Step 310 includes querying statuses of all deep learning job objects from a Kubernetes platform at a predetermined interval.

In this embodiment, an electronic device (e.g., the server shown in FIG. 1) performing the method for scheduling a resource for a deep learning framework may query the statuses of all deep learning job objects from the Kubernetes platform at the predetermined interval. Here, the predetermined interval may be predefined. By using a container cluster management system (the Kubernetes platform) as underlying container resource scheduling management, the scheduling management on different deep learning framework tasks may be realized.

A deep learning job object includes: a nodegroup parent attribute; an image sub-attribute set under the nodegroup parent attribute; and a resource configuration sub-attribute set under the nodegroup parent attribute.

Here, a type of a deep learning job resource may be defined to uniformly represent a deep learning model training task, and the type includes the nodegroup parent attribute, and the image sub-attribute and the resource configuration sub-attribute provided under the NodeGroup attribute. The differences of different deep learning tasks are represented in the number of NodeGroups, the specific image attribute value, and the resource configuration sub-attribute. For a specific training task, a developer submits and sends the constructed deep learning job object to the Kubernetes platform, and thus the operation of requesting the resource may be completed.

Step 320 includes extracting, in response to finding from the queried deep learning job objects a deep learning job object having a status conforming to a new creation status, a resource configuration sub-attribute of the deep learning job object having the status conforming to the new creation status.

In this embodiment, the statuses of all queried deep learning job objects are different. For example, there are mainly 4 statuses, including new creation, running, failure, and success. The Kubernetes platform mainly processes the "newly created" deep learning job object. Since the platform has not requested the corresponding container resource at this time, for the other three statuses, there is no need to request other container resources at present. The resource configuration sub-attribute here is used to represent the container resource and the network policy required for the deep learning job object.

Step 330 includes sending, based on the extracted resource configuration sub-attribute, a resource request to an application programming interface server service of the Kubernetes platform, to request the container resource and the network policy, and schedule a physical machine where the Kubernetes platform is located to initiate a deep learning training task.

In this embodiment, based on the resource configuration sub-attribute submitted by a user, the resource request may be sent to the application programming interface server service of the Kubernetes platform, to complete the operation of requesting the resource. Then, the deep learning training task is initiated by the physical machine where the Kubernetes platform is located.

In some alternative implementations of this embodiment, scheduling the physical machine where the Kubernetes platform is located to initiate the deep learning training task may include: receiving the resource request via the application programming interface server service of the Kubernetes platform, to create a resource object; asynchronously monitoring the created resource object via a scheduler service of the Kubernetes platform, to allocate the created resource object to a sub-node; and running the container corresponding to the resource object via the sub-node to complete the deep learning training task.

In this implementation, based on the resource request submitted by the electronic device performing the method for scheduling a resource for a deep learning framework, a computational resource container required for the resource request may be requested from the Kubernetes platform via the scheduler service of the Kubernetes platform. Finally, the computational resource container is ran to complete the deep learning training task. Therefore, the speed of scheduling the physical machine where the Kubernetes platform is located to initiate the deep learning training task is improved.

Step 340 includes reclaiming, in response to the status of the queried deep learning job object conforming to a termination status, a resource of a deep learning job object in the termination status.

In this embodiment, the method for scheduling a resource for a deep learning framework is also responsible for reclaiming the resource of the deep learning job object in the termination status. In the method for scheduling a resource for a deep learning framework, the management on the deep learning job object covers the entire life cycle, including creation, running until termination. In this life cycle, the developer only needs to focus on the training on the program logic of the task, without paying attention to environmental problems such as the allocation and reclaim of the resource and the network policy. The termination status herein may refer to the failure status and the success status.

In the method for scheduling a resource for a deep learning framework provided by the foregoing embodiment of the present disclosure, the resource request is sent to the application programming interface server service of the Kubernetes platform based on the extracted resource configuration sub-attribute, to request the container resource and the network policy, and the physical machine where the Kubernetes platform is located is scheduled to initiate the deep learning training task. In response to the status of the queried deep learning job object conforming to the termination status, the resource of the deep learning job object in the termination status is reclaimed. Therefore, the efficiency of requesting and releasing the container resource and the network policy is improved.

Figure 4:
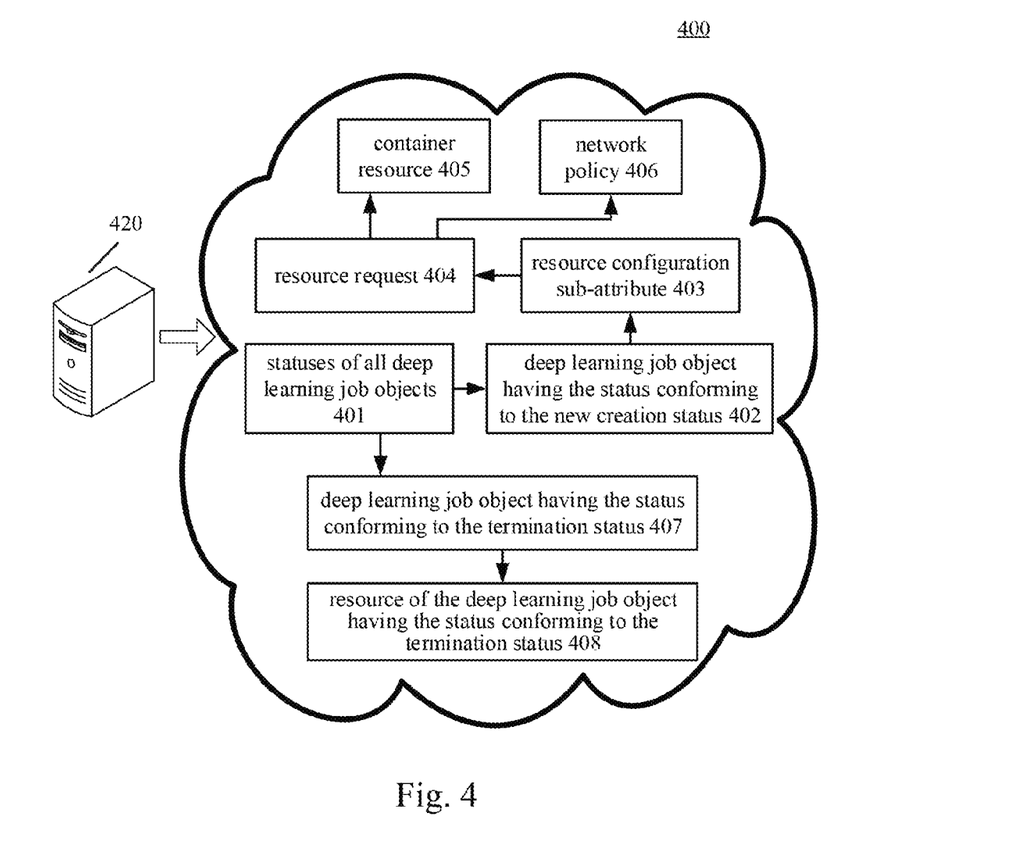
FIG. 4 is an application scenario of an embodiment of the method for scheduling a resource for a deep learning framework according to the embodiments of the present disclosure.

Further referring to FIG. 4, which is an application scenario of the method for scheduling a resource for a deep learning framework according to the embodiments of the present disclosure.

As shown in FIG. 4, the method for scheduling a resource for a deep learning framework is performed in the electronic device 420. The method includes the following steps.

First, the statuses 401 of all deep learning job objects are queried from a Kubernetes platform at a predetermined interval.

Then, in response to finding, from the queried deep learning job objects 401, the deep learning job object 402 having a status conforming to a new creation status, the resource configuration sub-attribute 403 of the deep learning job object 402 having the status conforming to the new creation status is extracted.

Next, based on the extracted resource configuration sub-attribute 403, the resource request 404 is sent to an application programming interface server service of the Kubernetes platform, to request the container resource 405 and the network policy 406.

Finally, in response to the queried deep learning job object 407 having a status conforming to a termination status, the resource 408 of the deep learning job object having the status conforming to the termination status is reclaimed.

It should be understood that the method for scheduling a resource for a deep learning framework shown in FIG. 4 is only an application scenario of the method for scheduling a resource for a deep learning framework, and does not represent a limitation to the present disclosure.

Figure 5:
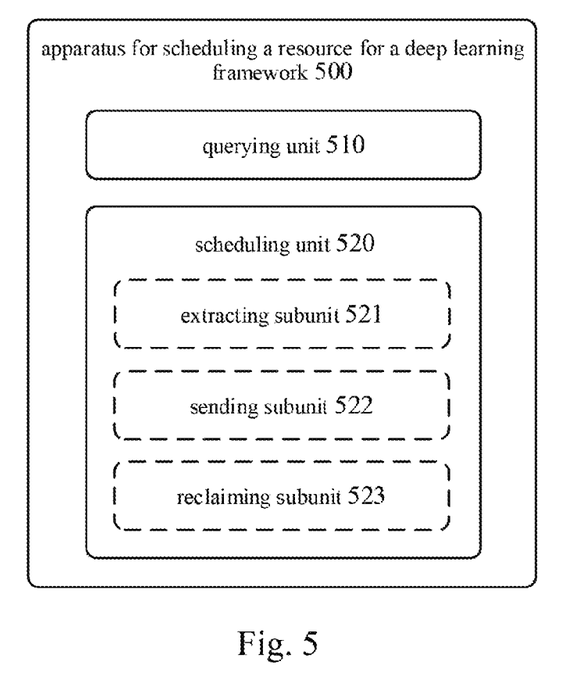
FIG. 5 is a schematic structural diagram of an embodiment of an apparatus for scheduling a resource for a deep learning framework according to the embodiments of the present disclosure.

Further referring to FIG. 5, as an implementation of the above method, the embodiments of the present disclosure provide an embodiment of an apparatus for scheduling a resource for a deep learning framework. The embodiment of the apparatus for scheduling a resource for a deep learning framework corresponds to the embodiments of the method for scheduling a resource for a deep learning framework shown in FIGS. 1-4. Accordingly, the operations and the features described for the method for scheduling a resource for a deep learning framework in FIGS. 1-4 are also applied to the apparatus 500 for scheduling a resource for a deep learning framework and the units included in the apparatus, which will not be repeatedly described herein.

As shown in FIG. 5, the apparatus 500 for scheduling a resource for a deep learning framework may include: a query unit 510, configured to query statuses of all deep learning job objects from a Kubernetes platform at a predetermined interval; and a scheduling unit 520, configured to submit, in response to finding from the queried deep learning job objects a deep learning job object having a status conforming to a resource request submission status, a resource request to the Kubernetes platform to schedule a physical machine where the Kubernetes platform is located to initiate a deep learning training task.

In some alternative implementations of this embodiment, the deep learning job objects in the querying unit include: a nodegroup parent attribute; an image sub-attribute set under the nodegroup parent attribute; and a resource configuration sub-attribute set under the nodegroup parent attribute.

In some alternative implementations of this embodiment, the scheduling unit 520 includes: an extracting subunit 521, configured to extract, in response to finding from the queried deep learning job objects a deep learning job object having a status conforming to a new creation status, a resource configuration sub-attribute of the deep learning job object having the status conforming to the new creation status; and a sending subunit 522, configured to send, based on the extracted resource configuration sub-attribute, the resource request to an application programming interface server service of the Kubernetes platform, to request a container resource and a network policy.

In some alternative implementations of this embodiment, the scheduling unit 520 includes: a reclaiming subunit 523, configured to reclaim, in response to finding from the queried deep learning job objects a deep learning job object having a status conforming to a termination status, a resource of the deep learning job object having the status conforming to the termination status.

In some alternative implementations of this embodiment, the scheduling unit schedules the physical machine where the Kubernetes platform is located to initiate the deep learning training task by: receiving the resource request via the application programming interface server service of the Kubernetes platform, to create a resource object; asynchronously monitoring the created resource object via a scheduler service of the Kubernetes platform, to allocate the created resource object to a sub-node; and running a container corresponding to the resource object via the sub-node, to complete the deep learning training task.

The present disclosure further provides an embodiment of a device. The device includes: one or more processors; and a storage device configured to storing one or more programs. The one or more programs, when executed by the one or more processors, cause the one or more processors to implement the method for scheduling a resource for a deep learning framework in any of the embodiments described above.

The present disclosure further provides an embodiment of a computer readable storage medium storing a computer program. The program, when executed by a processor, implements the method for scheduling a resource for a deep learning framework in any of the embodiments described above.

Figure 6:
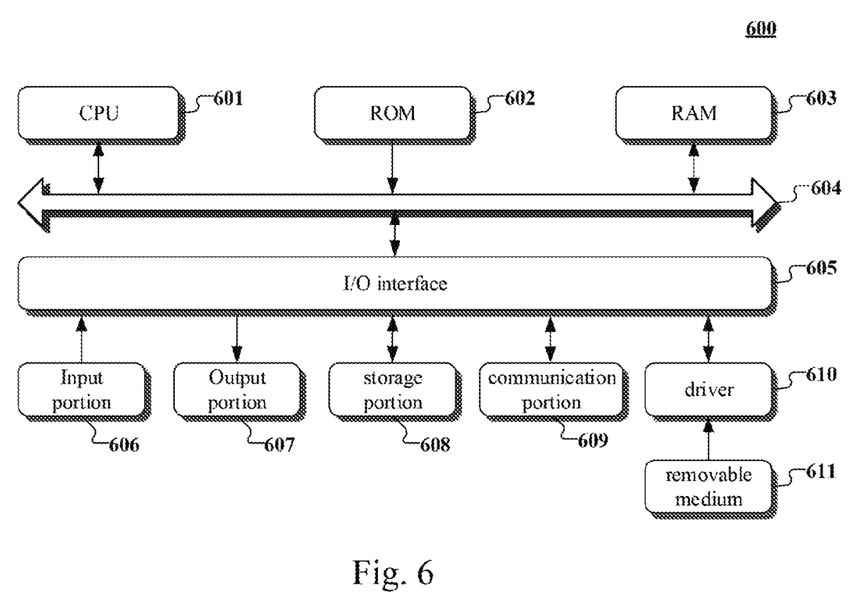
FIG. 6 is a schematic structural diagram of a computer system adapted to implement a terminal device or a server according to the embodiments of the present disclosure.

Referring to FIG. 6, a schematic structural diagram of a computer system 600 adapted to implement a terminal device or a server of the embodiments of the present disclosure is shown. The terminal device shown in FIG. 6 is only an example, and should not limit a function and scope of the embodiment of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium X11, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of some embodiments of the present disclosure.

It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a querying unit 510 and a scheduling unit 520, where the names of these units do not in some cases constitute a limitation to such units themselves. For example, the querying unit 510 may also be described as "a unit for querying statuses of all deep learning job objects from a Kubernetes platform at a predetermined interval."

In another aspect, the present disclosure further provides a non-volatile computer storage medium. The non-volatile computer storage medium may be the non-volatile computer storage medium included in the apparatus in the above described embodiments, or a stand-alone non-volatile computer storage medium not assembled into the apparatus. The non-volatile computer storage medium stores one or more programs. The one or more programs, when executed by a device, cause the device to: query statuses of all deep learning job objects from a Kubernetes platform at a predetermined interval; and submit, in response to finding from the queried deep learning job objects a deep learning job object having a status conforming to a resource request submission status, a resource request to the Kubernetes platform to schedule a physical machine where the Kubernetes platform is located to initiate a deep learning training task.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for scheduling a resource for a deep learning framework, comprising:
    querying statuses of all deep learning job objects from a Kubernetes platform at a predetermined interval, the deep learning job objects being uniformly represented by a nodegroup parent attribute, an image sub-attribute set under the nodegroup parent attribute and a resource configuration sub-attribute set under the nodegroup parent attribute, and being sent to the Kubernetes platform in advance; and
    finding from the queried deep learning job objects a first deep learning job object including a status conforming to a resource request submission status, and, in response to the finding, submitting a resource request to the Kubernetes platform to schedule a physical machine where the Kubernetes platform is located to initiate a deep learning training task,
    wherein the method is performed by at least one processor;
    wherein the submitting the resource request to the Kubernetes platform comprises:
        finding from the queried deep learning job objects a second deep learning job object including conforming to a failure status and, in response to the finding, reclaiming a resource of the second deep learning job object; and
        finding from the queried deep learning job objects a third deep learning job object including a status conforming to a success status and, in response to the finding, reclaiming a resource of the third deep learning job object; and
    wherein the submitting the resource request to the Kubernetes platform further comprises:
        finding from the queried deep learning job objects a fourth deep learning job object including a status conforming to a new creation status and, in response to the finding, extracting a resource configuration sub-attribute of the fourth deep learning job object; and
        sending, based on the extracted resource configuration sub-attribute, the resource request to an application programming interface server service of the Kubernetes platform, to request a container resource and a network policy corresponding to the extracted resource configuration sub-attribute.

2. The method according to claim 1, wherein the scheduling the physical machine where the Kubernetes platform is located to initiate the deep learning training task comprises:
    receiving the resource request via an application programming interface server service of the Kubernetes platform, to create a resource object;
    asynchronously monitoring the created resource object via a scheduler service of the Kubernetes platform, to allocate the created resource object to a sub-node; and
    running a container corresponding to the resource object via the sub-node, to complete the deep learning training task.

3. An apparatus for scheduling a resource for a deep learning framework, comprising:
    at least one processor; and
    a memory storing instructions, wherein the instructions when executed by the at least one processor, cause the at least one processor to perform operations, the operations comprising:
    querying statuses of all deep learning job objects from a Kubernetes platform at a predetermined interval, the deep learning job objects being uniformly represented by a nodegroup parent attribute, an image sub-attribute set under the nodegroup parent attribute and a resource configuration sub-attribute set under the nodegroup parent attribute, and being sent to the Kubernetes platform in advance; and submitting, in response to finding from the queried deep learning job objects a deep learning job object including a status conforming to a resource request submission status, a resource request to the Kubernetes platform to schedule a physical machine where the Kubernetes platform is located to initiate a deep learning training task; and wherein the submitting the resource request to the Kubernetes platform comprises:

reclaiming, in response to finding from the queried deep learning job objects a deep learning job object including a status conforming to a failure status, a resource of the deep learning job object including the status conforming to the failure status; and reclaiming, in response to finding from the queried deep learning job objects a deep learning job object including a status conforming to a success status, a resource of the deep learning job object including the status conforming to the success status, and wherein the submitting the resource request to the Kubernetes platform further comprises:

extracting, in response to finding from the queried deep learning job objects a deep learning job object including a status conforming to a new creation status, a resource configuration sub-attribute of the deep learning job object including the status conforming to the new creation status; and sending, based on the extracted resource configuration sub-attribute, the resource request to an application programming interface server service of the Kubernetes platform, to request a container resource and a network policy corresponding to the extracted resource configuration sub-attribute.

4. The apparatus according to claim 3, wherein the scheduling the physical machine where the Kubernetes platform is located to initiate the deep learning training task comprises:

receiving the resource request via an application programming interface server service of the Kubernetes platform, to create a resource object;

asynchronously monitoring the created resource object via a scheduler service of the Kubernetes platform, to allocate the created resource object to a sub-node; and running a container corresponding to the resource object via the sub-node, to complete the deep learning training task.

5. A non-transitory computer readable storage medium, storing a computer program, wherein the program, when executed by a processor, causes the processor to perform operations, the operations comprising:

querying statuses of all deep learning job objects from a Kubernetes platform at a predetermined interval, the deep learning job objects being uniformly represented by a nodegroup parent attribute, an image sub-attribute set under the nodegroup parent attribute and a resource configuration sub-attribute set under the nodegroup parent attribute, and being sent to the Kubernetes platform in advance; and submitting, in response to finding from the queried deep learning job objects a deep learning job object including a status conforming to a resource request submission status, a resource request to the Kubernetes platform to schedule a physical machine where the Kubernetes platform is located to initiate a deep learning training task; and wherein the submitting the resource request to the Kubernetes platform comprises:

reclaiming, in response to finding from the queried deep learning job objects a deep learning job object including a status conforming to a failure status, a resource of the deep learning job object including the status conforming to the failure status; and reclaiming, in response to finding from the queried deep learning job objects a deep learning job object including a status conforming to a success status, a resource of the deep learning job object including the status conforming to the success status, and wherein the submitting the resource request to the Kubernetes platform further comprises:

extracting, in response to finding from the queried deep learning job objects a deep learning job object including a status conforming to a new creation status, a resource configuration sub-attribute of the deep learning job object including the status conforming to the new creation status; and sending, based on the extracted resource configuration sub-attribute, the resource request to an application programming interface server service of the Kubernetes platform, to request a container resource and a network policy corresponding to the extracted resource configuration sub-attribute.

* * * * *